(12) United States Patent
Tung

(10) Patent No.: US 10,573,088 B2
(45) Date of Patent: Feb. 25, 2020

(54) THREE-DIMENSIONAL MODEL CUTTING METHOD AND ELECTRONIC APPARATUS

(71) Applicants: XYZprinting, Inc., New Taipei (TW); Kinpo Electronics, Inc., New Taipei (TW)

(72) Inventor: Chien-Hung Tung, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 50 days.

(21) Appl. No.: 15/806,290

(22) Filed: Nov. 7, 2017

(65) Prior Publication Data
US 2019/0073835 A1 Mar. 7, 2019

(30) Foreign Application Priority Data

Sep. 1, 2017 (CN) .......................... 2017 1 0777423

(51) Int. Cl.
*G06T 19/20* (2011.01)
*G06F 3/0481* (2013.01)
(Continued)

(52) U.S. Cl.
CPC ............ *G06T 19/20* (2013.01); *G06F 3/0486* (2013.01); *G06F 3/04812* (2013.01); *G06F 3/14* (2013.01);
(Continued)

(58) Field of Classification Search
None
See application file for complete search history.

(56) References Cited

U.S. PATENT DOCUMENTS 8,711,140 B1 * 4/2014 Mallet .................. G01V 99/005
345/419
10,163,252 B2 * 12/2018 Harlev .................... A61B 34/20
(Continued)

FOREIGN PATENT DOCUMENTS

EP            3136212           3/2017

OTHER PUBLICATIONS

Anatomical Plane, https://en.wikipedia.org/wiki/Anatornical_plane (Year: 2014).*
(Continued)

*Primary Examiner* — Nurun N Flora
(74) *Attorney, Agent, or Firm* — JCIPRNET

(57) ABSTRACT

A three-dimensional model cutting method and an electronic apparatus are provided. The method includes: displaying a three-dimensional model; receiving a first user input performed on the three-dimensional model; generating a first vector and a second vector based on a first coordinate point resulting from the first user input performed on the three-dimensional model, wherein the first and second vectors are perpendicular to each other and intersect at the first coordinate point; extending the first vector to form a cutting line and cutting the three-dimensional model based on the cutting line to form a first partial model on a first side of the cutting line and a second partial model on a second side of the cutting line, wherein the first side is in a direction of the second vector, and the second side is in an opposite direction; and removing the first partial model and retaining the second partial model.

10 Claims, 6 Drawing Sheets

(51) Int. Cl.
*G06F 3/0486* (2013.01)
*G06F 3/14* (2006.01)

(52) U.S. Cl.
CPC .... *G06T 2200/24* (2013.01); *G06T 2219/008* (2013.01); *G06T 2219/2008* (2013.01); *G06T 2219/2016* (2013.01); *G06T 2219/2021* (2013.01)

(56) References Cited

U.S. PATENT DOCUMENTS

| | | | | |
|---|---|---|---|---|
| 2007/0146325 A1* | 6/2007 | Poston | ............... | G06F 3/0317 345/163 |
| 2013/0093756 A1* | 4/2013 | Davidson | ............ | G06F 3/04815 345/419 |
| 2014/0314291 A1* | 10/2014 | Souza | ............... | G06T 7/0012 382/131 |

OTHER PUBLICATIONS

DAVIDESCOBAR3D,"MeshMixer: Fix, Cut and Export", Feb. 22, 2016, Retrieved from the Internet: URL:http://www.youtube.com/watch?v=bPqp9eeWmZQ.

Ryan Schmidt et al, "meshmixer: an interface for rapid mesh composition", Proceeding SIGGRAPH '10 ACM SIGGRAPH, ACM, Jul. 26, 2010, p. 1.

"Search Report of European Counterpart Application," dated Jul. 26, 2018, pp. 1-9.

* cited by examiner

THREE-DIMENSIONAL MODEL CUTTING METHOD AND ELECTRONIC APPARATUS

CROSS-REFERENCE TO RELATED APPLICATION

This application claims the priority benefit of China application serial no. 201710777423.8, filed on Sep. 1, 2017. The entirety of the above-mentioned patent application is hereby incorporated by reference herein and made a part of this specification.

BACKGROUND OF THE INVENTION

1. Field of the Invention

The invention relates to a model cutting method and an electronic apparatus and particularly relates to a three-dimensional model cutting method and an electronic apparatus using this method.

2. Description of Related Art

In general, a user can use a three-dimensional model editing software to cut a three-dimensional model. However, in existing three-dimensional model editing software (e.g., Meshmixer), it is common for a user to perform an input action input (e.g., drag a cursor) on a three-dimensional model, produce a vector, and define a cutting line based on the vector. After defining the cutting line, the three-dimensional model editing software can use this cutting line to cut a three-dimensional model.

In the three-dimensional model editing software described above, note that the part of the three-dimensional model which is to be removed by cutting the three-dimensional model according to the direction of the vector generated by the user when the cursor is dragged. For example, if the user drags the cursor from left to right to produce a horizontal vector, the three-dimensional model editing software cuts the three-dimensional model through applying an extension of this vector as the cutting line and removes the part of the model located above the cutting line; if the user drags the cursor from right to left to generate another horizontal vector, the three-dimensional editing software cuts the three-dimensional model using an extension of this vector as the cutting line and removes the part of the model located below the cutting line. However, it is often not possible for the user to know the exact direction in which the cursor should be dragged for removing the part of the three-dimensional model which the user wants to remove.

SUMMARY OF THE INVENTION

The invention provides a three-dimensional model cutting method and an electronic apparatus that uses this method, so that a user can clearly know the part of the three-dimensional model to be removed and the part to be retained when the three-dimensional model is being cut.

An embodiment of the invention provides a three-dimensional model cutting method including: displaying a three-dimensional model; receiving a first user input performed on the three-dimensional model; generating a first vector and a second vector based on a first coordinate point resulting from the first user input performed on the three-dimensional model, wherein the first vector and the second vector are perpendicular to each other and intersect at the first coordinate point; extending the first vector to form a cutting line and cutting the three-dimensional model on a basis of the cutting line to form a first partial model located on a first side of the cutting line and a second partial model located on a second side of the cutting line, wherein the first side is located in a direction of the second vector, and the second side is located in another direction opposite to the direction of the second vector; removing the first partial model of the three-dimensional model and retaining the second partial model of the three-dimensional model.

An embodiment of the invention provides an electronic apparatus including: a storage unit, a display unit, an input unit, and a processing unit. The storage unit records a plurality of modules. The display unit displays a three-dimensional model. The input unit receives a first user input performed on the three-dimensional model. The processing unit accesses the modules recorded by the storage unit to perform the following operations: generating a first vector and a second vector based on a first coordinate point resulting from the first user input performed on the three-dimensional model, wherein the first vector and the second vector are perpendicular to each other and intersect at the first coordinate point; extending the first vector to form a cutting line, cutting the three-dimensional model on a basis of the cutting line to form a first partial model located on a first side of the cutting line and to form a second partial model located on a second side of the cutting line, wherein the first side is located in a direction of the second vector and the second side is located in another direction opposite to the direction of the second vector; and removing the first partial model of the three-dimensional model and retaining the second partial model of the three-dimensional model.

Based on the above, the three-dimensional model cutting method and the electronic apparatus that uses this method of the invention enables the user to clearly know the part of the three-dimensional model to be removed and the part to be retained when the three-dimensional model is being cut.

In order to make the aforementioned features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the embodiments of invention, and examples of the embodiments will be described in the accompanying figures. In addition, whenever possible, identical or similar reference numbers stand for identical or similar elements in the figures and the embodiments.

Figure 1:
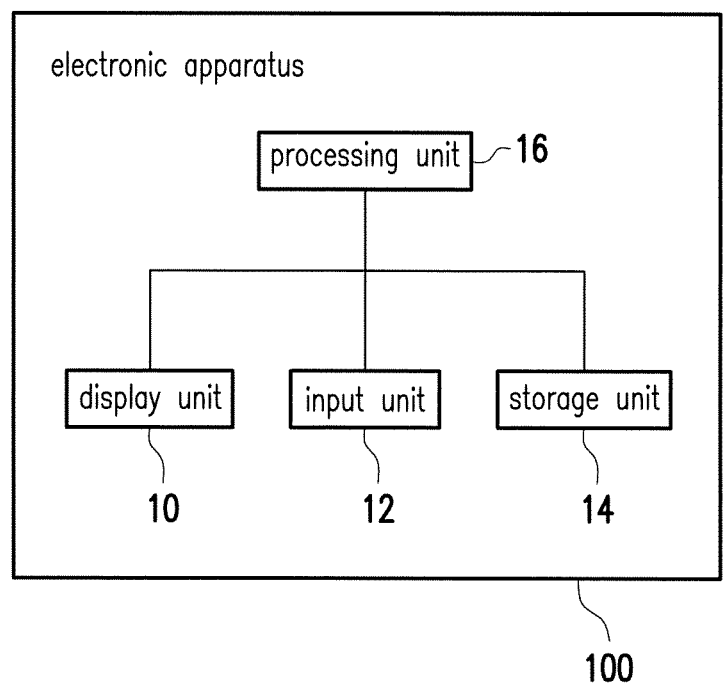
FIG. 1 is a schematic diagram of an electronic apparatus according to an embodiment of the invention.

FIG. 1 is a schematic diagram of an electronic apparatus according to an embodiment of the invention.

Referring to FIG. 1, the electronic apparatus 100 includes a display unit 10, an input unit 12, a storage unit 14, and a processing unit 16. Here, the display unit 10, the input unit 12, and the storage unit 14 are respectively coupled to the processing unit 16. The electronic apparatus 100 may be any electronic mobile device that is not limited hereto; for example, a mobile phone, a tablet PC, a laptop, etc.

The display unit 10 may be any display device that provides a display function within a display area of the electronic apparatus 100. The display unit 10 may be a liquid crystal display (LCD), a light-emitting diode (LED) display, a field emission display (FED), or any display device providing a display function.

The input unit 12 may be any input tool, such as a microphone, a touchpad, a stylus, a mouse, a keyboard, etc.

The storage unit 14 may be any type of fixed or movable random access memory (RAM), read-only memory (ROM), flash memory, similar components, or a combination of the above-mentioned components.

The processing unit 16 may be a central processing unit (CPU), or a microprocessor, a digital signal processor (DSP), a programmable controller, an application specific integrated circuit (ASIC) programmable for general or special use, other similar components, or a combination of the above-mentioned components.

In this embodiment, a plurality of programming code segments are stored in the storage unit 14 of the electronic apparatus 100, and the programming code segments are executed by the processing unit 16 after the installment of the programming code segments. For example, the storage unit 14 includes a plurality of modules, and each step in the three-dimensional model cutting method applied by the electronic apparatus 100 is respectively performed through the modules, wherein each module includes one or more programming code segments. However, the invention is not limited thereto; each step performed by the electronic apparatus 100 may also be carried out through the way of hardware.

FIG. 2A to FIG. 2D are schematic view illustrating a three-dimensional model cutting method according to an embodiment of the invention.

Figure 2A:
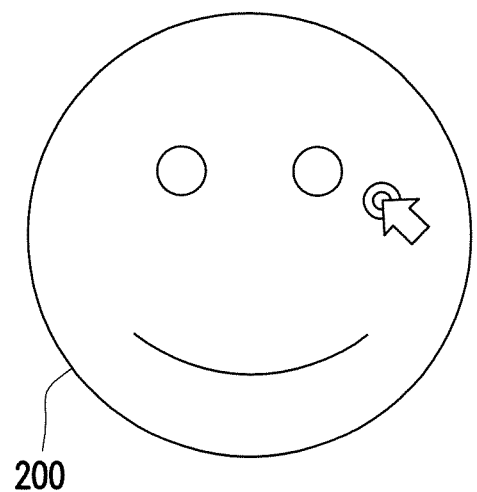
FIG. 2A to FIG. 2D are schematic views illustrating a three-dimensional model cutting method according to an embodiment of the invention.

Referring to FIG. 2A, first of all, the display unit 10 can display the three-dimensional model 200. It should be mentioned that the three-dimensional model 200 is not limited hereto and may be obtained from the storage unit 14 or by other means. In addition, for ease of explanation, the three-dimensional model 200 in FIG. 2A to FIG. 2D is represented by a planar two-dimensional figure.

Then, the electronic apparatus 100 may receive a first user input performed on the three-dimensional model 200 through the input unit 12, and the processing unit 16 generates a first vector and a second vector based on the first user input performed on the three-dimensional model at a first coordinate point, wherein the first vector and the second vector are perpendicular to each other and intersect at the first coordinate point.

Figure 2B:
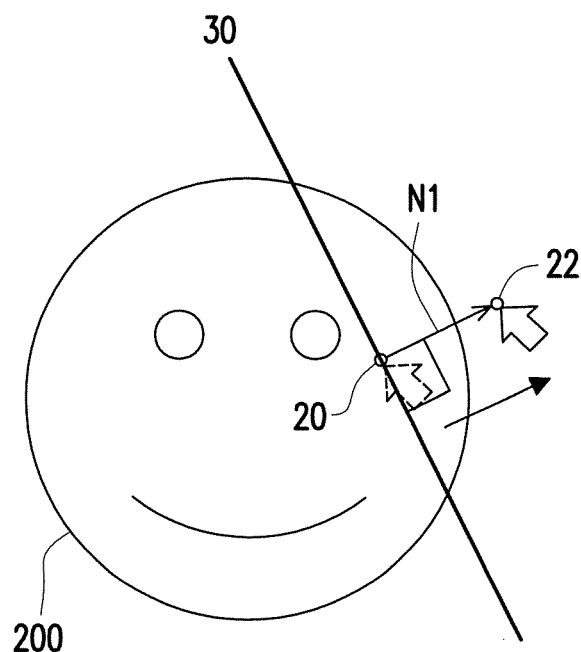
Figure 2C:
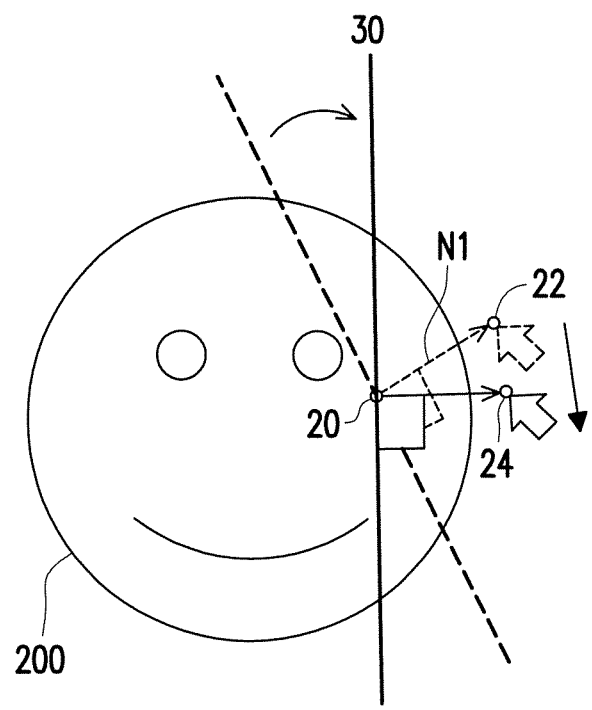

Referring to FIG. 2B, the first user input is, for example, an action of a user pressing down on the left mouse button and dragging the cursor from a coordinate point 20 (i.e., the first coordinate point) on the three-dimensional model 200 to a coordinate point 22 (i.e., the second coordinate point). The processing unit 16 may generate the vector N1 (also referred to as the second vector) based on the coordinate point 20 and the coordinate point 22.

Figure 3:
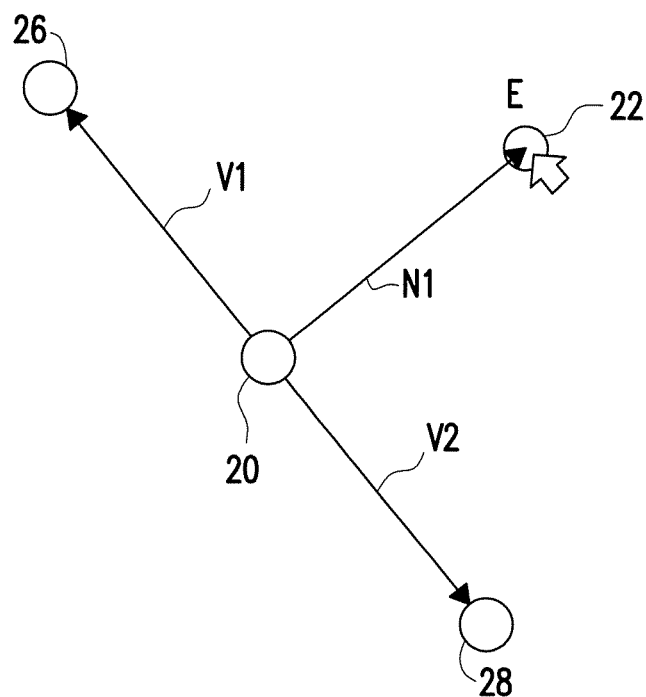
FIG. 3 is a schematic diagram of a vector according to an embodiment of the invention, wherein an inner product of the vector and a vector N1 is zero.

Besides, in the process of dragging the cursor to generate the vector N1, another vector may be generated in real-time, and an inner product of the vector and the vector N1 is zero. For example, FIG. 3 is a schematic diagram of a vector according to an embodiment of the invention, wherein an inner product of the vector and a vector N1 is zero. Referring to FIG. 3, a vector V1 (i.e., a third vector) and a vector V2 (i.e., a fourth vector) may be generated in real-time in the process of dragging the cursor to form the vector N1. Here, the inner product of the vector V1 and the vector N1 is zero, and the inner product of the vector V2 and the vector N1 is zero. In addition, a direction of the vector V1 is opposite to a direction of the vector V2, and a starting point of the vector V1, a starting point of the vector V2, and a starting point of the vector N1 are all the coordinate point 20. The vector V1 and the vector V2 may be jointly referred to as a first vector, and the first vector and the vector N1 are perpendicular to each other and intersect at the coordinate point 20.

According to the aforementioned method, it should be noted that a user may decide the vector N1 on his/her own, and the processing unit 16 generates the aforementioned vector 1 based on the vector N1. However, the invention is not limited thereto; in another embodiment, before the step of dragging the cursor from the coordinate point 20 on the three-dimensional model 200 to the coordinate point 22, a user may press down on the left mouse button and drag the cursor from a coordinate point (referred to as a fifth coordinate point but not shown in the drawings) on the three-dimensional model 200 to the coordinate point 20, so that the processing unit 16 defines (or forms) the vector V1 based on the fifth coordinate point and the coordinate point 20, and the processing unit 16 generates the vector V2 based on the vector V1. Here, the fifth coordinate point is, for example, a coordinate point located on the vector V1. When the user drags the cursor from the fifth coordinate point to the coordinate point 20, the user may then generate the vector N1 by dragging the cursor from the coordinate point 20 to the coordinate point 22.

Referring to FIG. 2B, after defining the vector N1, the vector V1, and the vector V2 described above, the processing unit 16 may extend the vector V1 and the vector V2 to form the cutting line 30. Afterwards, referring to FIG. 2C, the input unit 12 may also receive a second user input. This second user input is, for example, following a first user input. In the case of not releasing the left mouse button, the user may move the mouse to move the coordinate point 22 on the vector N1 to another new coordinate point 24. While in the process of moving the coordinate point 22 on the vector N1 to another new coordinate point 24, the vector N1 rotates with the coordinate point 20 as its center, and the processing unit 16 rotates the first vector (or the cutting line 30 formed by the first vector) with the coordinate point 20 as its center such that the first vector and the second vector remain perpendicular to each other and intersect at the coordinate point 30. With this second user input, the user may freely adjust the position of the cutting line 30.

Figure 2D:
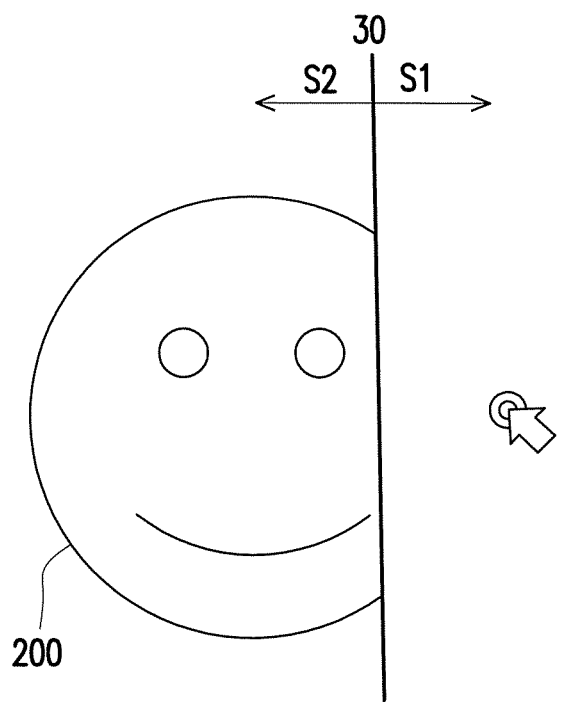

Afterwards, as shown in FIG. 2D, when the user releases the left mouse button, the processing unit 16 cuts the three-dimensional model 200 on the basis of the cutting line 30 to form a first partial model (not shown) located on a first side S1 of the cutting line 30 and a second partial model located on a second side S2 of the cutting line. The processing unit 16 removes the first partial model and retains the second partial model, wherein the first side S1 is located in a direction of the vector N1, and the second side S2 is located in another direction opposite to the direction of the vector N1. As can be clearly seen in FIG. 2C and FIG. 2D, the vector N1 starts at the coordinate point 20 of the cutting line 30, and the vector N1 is located on the first side S1 of the cutting line 30. The second side S2 of the cutting line 30 does not include a vector N2. Through the vector N1 generated via the dragging by the user, the user may clearly know that the first partial model located on the first side S1 of the cutting line 30 is to be removed.

Figure 4:
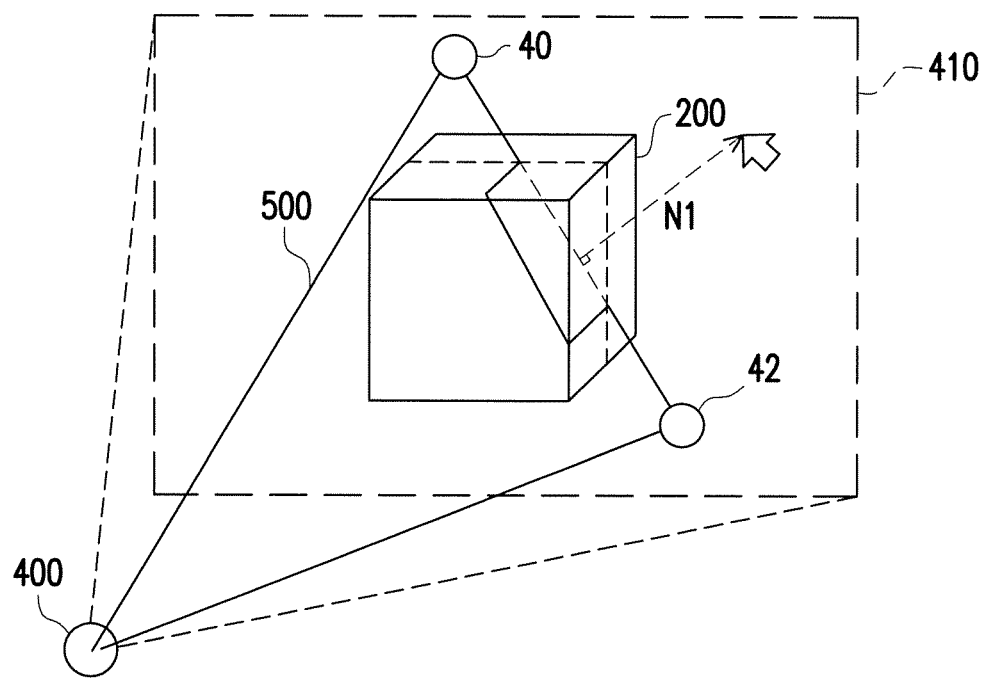
FIG. 4 is a schematic diagram of cutting a three-dimensional model using a cutting plane according to an embodiment of the invention.

Specifically, in the process of actually cutting the three-dimensional model 200, a cutting plane is used to perform the cutting action. FIG. 4 is a schematic diagram of cutting a three-dimensional model with use of a cutting plane according to an embodiment of the invention. Please simultaneously refer to FIG. 3 and FIG. 4, wherein the processing unit 16 respectively converts the coordinate point 26 (i.e., the third coordinate point) at an end point of the vector V1 and the coordinate point 28 (i.e., the fourth coordinate point) at an end point of the vector V2 to a spatial coordinate 40 (i.e., a first spatial coordinate) and a spatial coordinate 42 (i.e., a second spatial coordinate) based on a viewing angle 400 of a viewpoint 400 and a distance between the viewpoint 400 and the three-dimensional model 200. The way to covert the coordinates can be known from the related art and thus is not described hereinafter. Afterwards, the processing unit 16 generates a cutting plane 500 in a three-dimensional space based on the spatial coordinate 40, the spatial coordinate 42, and a spatial coordinate (i.e., a third spatial coordinate) of the viewpoint 400 in the three-dimensional space. The processing unit cuts the three-dimensional model 200 on the basis of the cutting plane 500 to form the first partial model and the second partial model, wherein the first partial model is located in a normal vector direction of the cutting plane 500, and the normal vector direction of the cutting plane is the same as the direction of the vector N1. Afterwards, the processing unit 16 removes the first partial model and retains the second partial model.

Figure 5A:
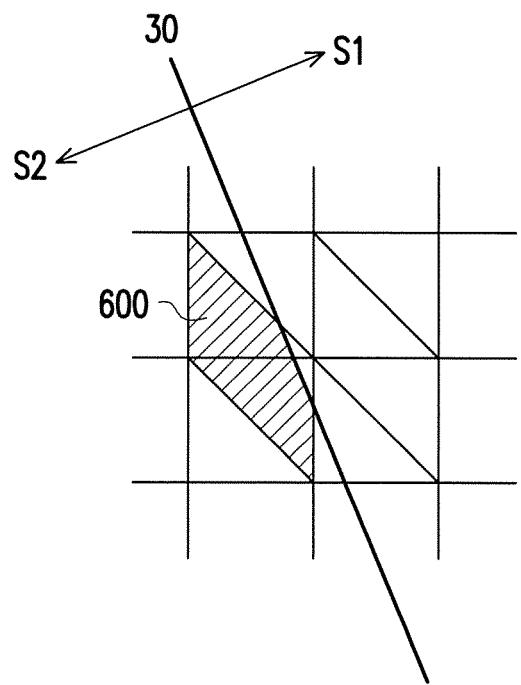
FIG. 5A and FIG. 5B are schematic diagrams showing an amended second partial model according to an embodiment of the invention.
Figure 5B:
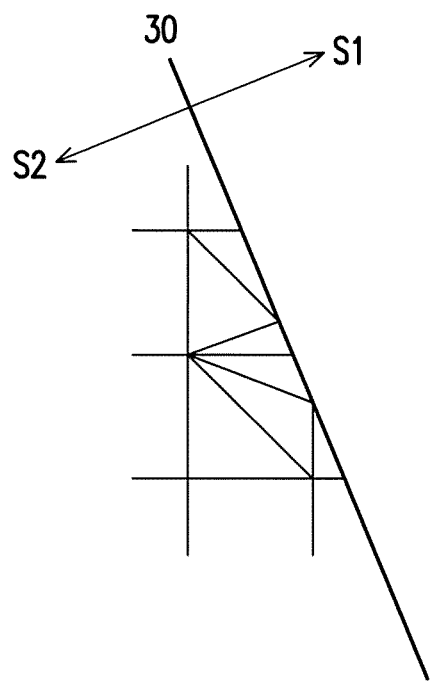

In addition, the three-dimensional model is usually composed of a plurality of triangular grids, and non-triangular grids may be generated in the second partial model retained after the three-dimensional model 200 is cut. For example, FIG. 5A and FIG. 5B are schematic diagrams showing an amended second partial model according to an embodiment of the invention. Referring to FIG. 5A and FIG. 5B, when the processing unit 16 cuts the three-dimensional model 200 on the basis of the cutting line 30 to form the first partial model located on the first side S1 of the cutting line 30 and the second partial model located on the second side S2 of the cutting line, the processing unit 16 removes the grids of the first partial model (i.e., the first grids) and retains the grids (i.e., the second grids) of the second partial model. Particularly, in the embodiment shown in FIG. 5A, the grids within a grid area 600 in the second partial model are not triangular grids. Therefore, the processing unit 16 corrects the grids within the grid area 600, so that the amended second grids are triangular grids as shown in FIG. 5B.

Figure 6:
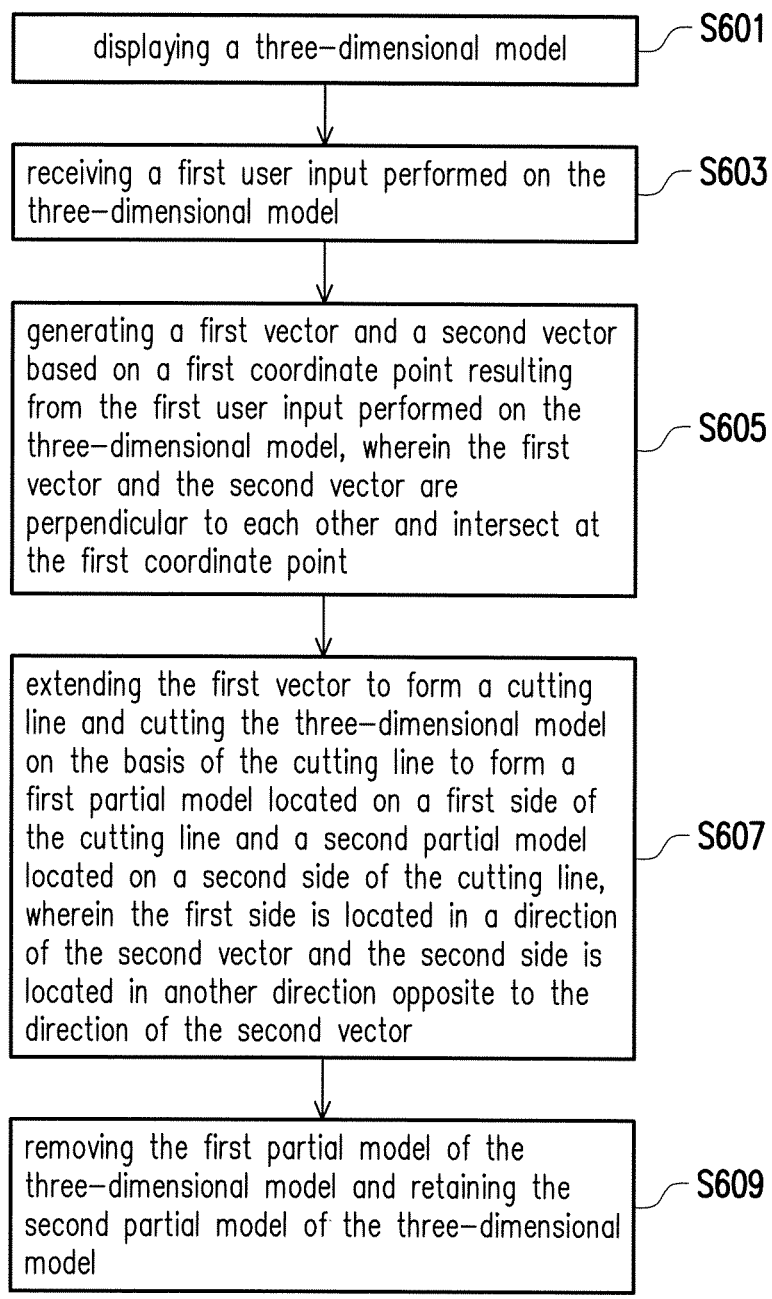
FIG. 6 is a flowchart showing a three-dimensional model cutting method according to an embodiment of the invention.

FIG. 6 is a flowchart showing a three-dimensional model cutting method according to an embodiment of the invention.

Referring to FIG. 6, in step S601, a display unit 10 displays a three-dimensional model. In step S603, an input unit 12 receives a first user input performed on the three-dimensional model. In step S605, a processing unit 16 generates a first vector and a second vector based on a first user input performed on a first coordinate point of the three-dimensional model, wherein the first vector and the second vector are perpendicular to each other and intersect at the first coordinate point. In step S607, the processing unit 16 extends the first vector to form a cutting line and cuts the three-dimensional model on the basis of the cutting line to form a first partial model located on a first side of the cutting line and a second partial model located on a second side of the cutting line, wherein the first side is located in a direction of the second vector, and the second side is located in another direction opposite to the direction of the second vector. In step S609, the processing unit 16 removes the first partial model of the three-dimensional model and retains the second partial model of the three-dimensional model.

In summary, the three-dimensional model cutting method and the electronic apparatus that uses this method provided in the invention allow the user to clearly know the part of the three-dimensional model to be removed and the part to be retained when the three-dimensional model is being cut.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A three-dimensional model cutting method, comprising:
    displaying a three-dimensional model;
    receiving a first user input performed on the three-dimensional model;
    generating a first vector and a second vector based on a first coordinate point resulting from the first user input performed on the three-dimensional model, wherein the first vector and the second vector are perpendicular to each other and intersect at the first coordinate point;
    extending the first vector to form a cutting line and cutting the three-dimensional model on a basis of the cutting line to form a first partial model located on a first side of the cutting line and a second partial model located on a second side of the cutting line, wherein the first side is located in a direction of the second vector, and the second side is located in another direction opposite to the direction of the second vector; and
    removing the first partial model of the three-dimensional model and retaining the second partial model of the three-dimensional model,
    wherein the first vector comprises a third vector and a fourth vector, a direction of the third vector is opposite to a direction of the fourth vector, a starting point of the third vector and a starting point of the fourth vector are the first coordinate point, an inner product of the third vector and the second vector is zero, and an inner product of the fourth vector and the second vector is zero,
    wherein the step of cutting the three-dimensional model on the basis of the cutting line comprises:
        based on a viewing angle of a viewpoint in a three-dimensional space and a distance between the viewpoint and the three-dimensional model, a third coordinate point located at an end point of the third vector and a fourth coordinate point located at an end point of the fourth vector are respectively converted into a first spatial coordinate and a second spatial coordinate in the three-dimensional space;

generating a cutting plane in the three-dimensional space based on the first spatial coordinate, the second spatial coordinate, and a third spatial coordinate of the viewpoint; and cutting the three-dimensional model on a basis of the cutting plane to form the first partial model and the second partial model, wherein the first partial model is located at a normal vector direction of the cutting plane, and the normal vector direction of the cutting plane is the same as the direction of the second vector.

2. The three-dimensional model cutting method of claim 1, wherein the first user input is dragged from the first coordinate point of the three-dimensional model to a second coordinate point, and the first coordinate point and the second coordinate point form the second vector.

3. The three-dimensional model cutting method of claim 2, wherein prior to the step of cutting the three-dimensional model on the basis of the cutting line, the method further comprises:

receiving a second user input;

moving the second coordinate point to another coordinate point based on the second user input, so that the second vector rotates with the first coordinate point as its center; and rotating the first vector with the first coordinate point as its center, so that the first vector and the second vector remain perpendicular to each other and intersect at the first coordinate point.

4. The three-dimensional model cutting method of claim 2, wherein prior to the step of dragging the first user input from the first coordinate point of the three-dimensional model to the second coordinate point, the first user input further comprises dragging the first user input from a fifth coordinate point of the three-dimensional model to the first coordinate point, and the fifth coordinate point and the first coordinate point form the first vector.

5. The three-dimensional model cutting method of claim 1, wherein the step of removing the first partial model of the three-dimensional model and retaining the second partial model of the three-dimensional model comprises:

removing a first grid of the first partial model of the three-dimensional model in the normal vector direction of the cutting plane; and correcting a second grid among the second partial model, so that the corrected second grid is a triangular grid.

6. An electronic apparatus, comprising:

a memory, recording a plurality of modules;

a display, displaying a three-dimensional model;

an input circuit, receiving a first user input performed on the three-dimensional model; and a processor, accessing the plurality of modules recorded by the memory to perform following operations:

generating a first vector and a second vector based on a first coordinate point resulting from the first user input performed on the three-dimensional model, wherein the first vector and the second vector are perpendicular to each other and intersect at the first coordinate point;

extending the first vector to form a cutting line and cutting the three-dimensional model on a basis of the cutting line to form a first partial model located on a first side of the cutting line and to form a second partial model located on a second side of the cutting line, wherein the first side is located in a direction of the second vector, and the second side is located in another direction opposite to the direction of the second vector; and removing the first partial model of the three-dimensional model and retaining the second partial model of the three-dimensional model, wherein the first vector comprises a third vector and a fourth vector, a direction of the third vector is opposite to a direction of the fourth vector, a starting point of the third vector and a starting point of the fourth vector are the first coordinate point, an inner product of the third vector and the second vector is zero, and an inner product of the fourth vector and the second vector is zero, wherein when the three-dimensional model is cut on the basis of the cutting line, the processor respectively converts a third coordinate point at an end point of the third vector and a fourth coordinate point at an end point of the fourth vector to a first spatial coordinate and a second spatial coordinate in the three-dimensional space based on a viewing angle of a viewpoint in a three-dimensional space and a distance between the viewpoint and the three-dimensional model, the processor generates a cutting plane in the three-dimensional space based on the first spatial coordinate, the second spatial coordinate, and a third spatial coordinate of the viewpoint, and the processor cuts the three-dimensional model on the basis of the cutting plane to form the first partial model and the second partial model, wherein the first partial model is located at a normal vector direction of the cutting plane, and the normal vector direction of the cutting plane is the same as the direction of the second vector.

7. The electronic apparatus of claim 6, wherein the first user input is dragged from the first coordinate point of the three-dimensional model to a second coordinate point, and the first coordinate point and the second coordinate point form the second vector.

8. The electronic apparatus of claim 7, wherein before the three-dimensional model is cut on the basis of the cutting line, the input circuit receives a second user input, the processor moves the second coordinate point to another coordinate point based on the second user input, so that the second vector rotates with the first coordinate point as its center, and the processor rotates the first vector with the first coordinate point as its center, so that the first vector and the second vector remain perpendicular to each other and intersect at the first coordinate point.

9. The electronic apparatus of claim 7, wherein before the first user input of is dragged from the first coordinate point of the three-dimensional model to the second coordinate point, the first user input further comprises dragging the first user input from a fifth coordinate point of the three-dimensional model to the first coordinate point, and the fifth coordinate point and the first coordinate point form the first vector.

10. The electronic apparatus of claim 6, wherein when the first partial model of the three-dimensional model is removed and the second partial model of the three-dimensional model is retained, the processor removes a first grid of the first partial model of the three-dimensional model in the normal vector direction of the cutting plane, and the processor corrects a second grid in the second partial model, so that said the corrected second grid is a triangular grid.

\* \* \* \* \*